United States Patent [19]
Roth et al.

[11] Patent Number: 5,994,475
[45] Date of Patent: Nov. 30, 1999

[54] REACTION PRODUCTS OF AMINE AND A CARBOXYL FUNCTIONAL MICROGEL

[75] Inventors: Martin Roth, Hölstein; Qian Tang, Oberwil; Sameer Hosam Eldin, Courtepin, all of Switzerland

[73] Assignee: Ciba Specialty Chemicals Corp., Tarrytown, N.Y.

[21] Appl. No.: 08/886,308

[22] Filed: Jul. 1, 1997

[30] Foreign Application Priority Data

Jul. 2, 1996 [CH] Switzerland ............................. 1658/96
Jul. 10, 1996 [CH] Switzerland ............................. 1745/96

[51] Int. Cl.$^6$ ................................................... C08F 26/06
[52] U.S. Cl. ................................. 525/326.7; 525/329.9; 525/330.5; 525/333.6; 525/375; 525/317.1; 525/319
[58] Field of Search .............................. 525/326.7, 329.9, 525/330.5, 333.6, 374, 375; 526/317.1, 319

[56] References Cited

U.S. PATENT DOCUMENTS

| | | | |
|---|---|---|---|
| 4,129,670 | 12/1978 | Riew | 427/386 |
| 4,415,697 | 11/1983 | Peng et al. | 524/523 |
| 4,503,174 | 3/1985 | Vasta | 523/439 |
| 4,539,348 | 9/1985 | Galria et al. | 524/522 |
| 5,280,095 | 1/1994 | Aizawa et al. | 526/307.6 |
| 5,292,797 | 3/1994 | Goldner et al. | 524/556 |

FOREIGN PATENT DOCUMENTS

| | | |
|---|---|---|
| 0123793 | 11/1984 | European Pat. Off. . |
| 0189553 | 8/1986 | European Pat. Off. . |
| 0304503 | 3/1989 | European Pat. Off. . |
| 0362787 | 4/1990 | European Pat. Off. . |
| 0440583 | 8/1991 | European Pat. Off. . |
| 0449776 | 10/1991 | European Pat. Off. . |
| 0578613 | 1/1994 | European Pat. Off. . |
| 4007559 | 9/1991 | Germany . |

OTHER PUBLICATIONS

Derwent Abstr. 96–094276, Jun. 20, 1994.
Derwent Abstr. 91–264065, Jul. 18, 1990.
Derwent Abst. 90–271560/36 of JP–A–Hei 02–191624, Jan. 20, 1984.

*Primary Examiner*—Randy Gulakowski
*Attorney, Agent, or Firm*—David R. Chrichton; Michele A. Kovaleski

[57] ABSTRACT

Reaction products of a microgel that contains carboxylic acid groups with a nitrogen-containing base have a high latency and high stability towards mechanical influences and are suitable as hardeners for one-component epoxy resin systems.

18 Claims, No Drawings

REACTION PRODUCTS OF AMINE AND A CARBOXYL FUNCTIONAL MICROGEL

The present invention relates to a reaction product of a microgel that contains carboxylic acid groups with a nitrogen-containing base (microgel amine salt or microgel imidazole salt), to a process for the preparation of such a reaction product, to a composition comprising such a reaction product and an epoxy resin, and also to cross-linked products obtainable by curing that composition.

Nitrogen-containing bases are well known to the person skilled in the art as hardeners or curing-accelerators for epoxy resins. However, such systems have only limited storage stability, since the bases react with epoxides even at relatively low temperature, in some cases even at room temperature, which manifests itself in an increase in the viscosity of the epoxy resin formulation and, in the case of a prolonged period of storage, results in gelling of the mixture. Increasing reactivity of the nitrogen-containing base reduces the storage stability of the epoxy resin mixture and shortens the usable life (pot life). For that reason, such systems are formulated in the form of two-component systems, that is to say the epoxy resin and the nitrogen-containing base are stored separately and are mixed together only shortly before processing.

Attempts have been made to improve the storage stability of such systems by developing curing systems that have a high latency. High latency means high stability at the storage temperature in question without there being any substantial reduction in the reactivity at the desired curing temperature.

EP-A-304 503 describes master batches comprising encapsulated materials and epoxides as latent hardeners for epoxy resins, the core material being a tertiary amine in the form of a powder, which is surrounded by a shell comprising a reaction product of the same amine with an epoxy resin.

A similar curing system, but having a core material comprising an amine and an anhydride, is disclosed in JP-A-Hei 02-191624.

Although such latent hardeners or accelerators based on encapsulated particles are suitable for the preparation of one-component systems that are stable to storage, they have the disadvantage of insufficient stability towards mechanical influences, such as, for example, shearing forces and compressive loads.

The problem underlying the present invention is to provide latent epoxy curing systems having an improved pot life that also have higher stability towards mechanical stress in the form of shearing forces.

It has now been found that salts of microgels that contain COOH groups with nitrogen bases have the required property profile.

The present invention relates to a reaction product of a microgel that contains carboxylic acid groups with a nitrogen-containing base.

Generally, microgels are understood to mean macromolecules, the chain segments of which are cross-linked in the region of the individual agglomerates by covalent bridges. Microgels can be prepared in accordance with various known polymerisation methods. An advantageous method is the emulsion polymerisation of compounds having polymerisable C—C double bonds in the presence of so-called multifunctional cross-linkers, for example in accordance with the seeding technique. In that technique, after the polymerisation the microgel particles are in the form of an aqueous emulsion or suspension. The further reaction with the nitrogen-containing base can be carried out preferably using such an emulsion/suspension. It is, however, also possible first to isolate the microgel in the form of a solid powder, for example by means of spray-drying or freeze-drying, or to convert the aqueous emulsion into an organic phase by solvent exchange.

In principle, any compounds containing at least two polymerisable C—C double bonds may be used as multifunctional cross-linkers.

Intramolecularly cross-linked copolymers are formed, which generally have particle sizes in the nanometer range (approximately from 5 to 1000 nm).

A preferred microgel for the preparation of the reaction product according to the invention is a copolymer of at least one unsaturated carboxylic acid and at least one multifunctional cross-linker.

An especially preferred microgel is a copolymer of at least one unsaturated carboxylic acid, at least one vinyl monomer that contains no carboxylic acid groups and at least one multifunctional cross-linker.

In principle, any carboxylic acids that contain a polymerisable C—C double bond are suitable for the preparation of microgels that contain carboxylic acid groups.

Preferred unsaturated carboxylic acids are acrylic acid, methacrylic acid, 2-carboxyethyl acrylate, 2-carboxyethyl methacrylate, phthalic acid mono(2-acryloylethyl) ester, phthalic acid mono(2-methacryloylethyl) ester, maleic acid, maleic acid monomethyl ester, maleic acid monoethyl ester, fumaric acid, fumaric acid monomethyl ester, fumaric acid monoethyl ester, itaconic acid, cinnamic acid, crotonic acid, 4-vinylcyclohexanecarboxylic acid, 4-vinylphenylacetic acid and p-vinylbenzoic acid.

Acrylic acid and methacrylic acid are especially preferred.

In principle, any compounds containing at least two polymerisable C—C double bonds are suitable as multifunctional cross-linkers. Also suitable as multifunctional cross-linkers are mixtures of at least two vinyl monomers, for example methacrylic acid and glycidyl methacrylate, that are capable of reacting with one another by way of additional functional groups during or after the polymerisation reaction.

As a multifunctional cross-linker it is preferred to use a polyfunctional acrylic acid ester or methacrylic acid ester of an aliphatic, cycloaliphatic or aromatic polyol, an addition product of acrylic acid or methacrylic acid and a polyglycidyl compound, an addition product of acrylic acid or methacrylic acid and glycidyl acrylate or methacrylate, an acrylic acid alkenyl ester or methacrylic acid alkenyl ester, a dialkenylcyclohexane or a dialkenylbenzene.

Especially preferred multifunctional cross-linkers are ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropane trimethacrylate, diglycidyl ether diacrylate of bisphenol A, diglycidyl ether dimethacrylate of bisphenol A, acrylic acid allyl ester, methacrylic acid allyl ester, divinylcyclohexane and divinylbenzene.

The monomer mixture used for the preparation of the microgels may contain one or more vinyl monomers that contain no carboxylic acid groups, for example butadiene and butadiene derivatives, acrylonitrile, methacrylonitrile, acrylic acid esters and amides, methacrylic acid esters and amides, vinyl ethers and esters, allyl ethers and esters, styrene and styrene derivatives.

Preferred vinyl monomers that contain no carboxylic acid groups are alkyl esters, hydroxyalkyl esters and glycidyl esters of unsaturated carboxylic acids, and styrene derivatives.

Especially preferred vinyl monomers that contain no carboxylic acid groups are methyl acrylate, methyl methacrylate, ethyl acrylate, ethyl methacrylate, 2-hydroxyethyl acrylate, 2-hydroxyethyl methacrylate, butyl acrylate, butyl methacrylate, 2-ethylhexyl acrylate, 2-ethylhexyl methacrylate and styrene.

The reaction product according to the invention is preferably prepared from a microgel that is a copolymer of from 2 to 70% by weight of at least one unsaturated carboxylic acid, from 0 to 96% by weight of at least one vinyl monomer that contains no carboxylic acid groups and from 2 to 70% by weight of at least one multifunctional cross-linker, the total of the percentages by weight always being 100.

Especially preferred microgels are copolymers of from 5 to 50% by weight, especially from 10 to 40% by weight, of at least one unsaturated carboxylic acid, from 0 to 90% by weight, especially from 30 to 85% by weight, of at least one vinyl monomer that contains no carboxylic acid groups and from 5 to 50% by weight, especially from 5 to 30% by weight, of at least one multifunctional cross-linker.

For simplicity, the reaction products according to the invention are referred to hereinafter as "microgel amine salts", the term "amine" in this context denoting quite generally "nitrogen-containing bases" and not being limited to the meaning of the term "amine" in its stricter sense.

Suitable nitrogen-containing bases for the preparation of the reaction products according to the invention are in principle any basic compounds containing at least one basic nitrogen atom.

Examples thereof are aliphatic, cycloaliphatic and aromatic amines and also saturated and unsaturated N-heterocycles.

Primary, secondary and tertiary amines may be used; it is also possible to use compounds having a plurality of basic nitrogen atoms. Examples thereof are imidazoles, polyamines, such as triethylenetetramine or isophoronediamine, polyaminoamides, for example, the reaction products of aliphatic polyamines and dimerised or trimerised fatty acids, and also polyoxyalkyleneamines, for example Jeffamine® (Texaco).

Preferably an amine, a polyamine or an imidazole is used.

Mixtures of amines and imidazoles are, of course, also suitable.

Especially preferred nitrogen-containing bases are the amines and imidazoles of formula I, II or III

NR$_1$R$_2$R$_3$ (I),

R$_4$R$_5$N—A—NR$_6$R$_7$ (II)

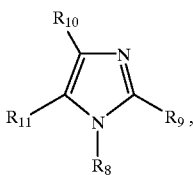

(III)

wherein R$_1$ to R$_7$ are each independently of the others hydrogen, C$_1$–C$_{12}$alkyl, unsubstituted or substituted phenyl, benzyl, phenylethyl, cyclopentyl or cyclohexyl, or R$_2$ and R$_3$ or R$_4$ and R$_5$ or R$_6$ and R$_7$ together form tetramethylene, pentamethylene, —(CH$_2$)$_2$—O—(CH$_2$)$_2$— —(CH$_2$)$_2$—NH—(CH$_2$)$_2$—, A is C$_1$–C$_{30}$alkanediyl, R$_8$ to R$_{11}$ are each independently of the others hydrogen, C$_1$–C$_{18}$alkyl, phenyl or benzyl, or R$_8$ and R$_9$ or R$_8$ and R$_{11}$ or R$_{10}$ and R$_{11}$ together form tetramethylene, pentamethylene, —(CH$_2$)$_2$—O—(CH$_2$)$_2$— or —(CH$_2$)$_2$—NH—(CH$_2$)$_2$—.

Examples of amines of formula I are trimethylamine, triethylamine, phenyldimethylamine, diphenylmethylamine, triphenylamine, benzylamine, N,N-dimethylbenzylamine, pyrrolidine, N-methylpyrrolidine, N-methylpiperidine and N-phenylpiperidine.

Suitable diamines of formula II are, for example, 1,2-diaminoethane and N,N,N',N'-tetramethyl-1,2-diaminoethane.

Examples of imidazoles of formula III are imidazole, 1-methylimidazole, 2-methylimidazole, 2-phenylimidazole, 2-isopropylimidazole, 2-dodecylimidazole, 2-heptadecylimidazole and 2-ethyl-4-methylimidazole.

2-Phenylimidazole, 2-isopropylimidazole, 2-dodecylimidazole, 2-heptadecylimidazole and 2-ethyl-4-methylimidazole are especially preferred nitrogen-containing bases.

The reaction of the nitrogen-containing base with the microgel that contains carboxylic acid groups is preferably carried out in solution. Preferred solvents are water and mixtures of water and water-miscible solvents, for example, methanol, ethanol, isopropanol or acetone. The emulsion or suspension produced in the preparation of the microgel by emulsion polymerisation can be used directly. The reaction temperatures are advantageously from 0° to 200° C., preferably from 10 to 100° C. The relative proportions of the starting materials can vary within wide limits. Advantageously, however, the microgel that contains carboxylic acid groups and the nitrogen-containing base are used in amounts such that the COOH groups are present in equimolar amounts or in excess in relation to basic nitrogen atoms. The number of basic nitrogen atoms, based on the number of COOH groups in the microgel, is preferably from 5 to 100 mol %, especially from 30 to 100 mol % and more especially from 60 to 95 mol %.

The isolation of the microgel amine salt in the form of a solid powder may be carried out by means of spray-drying or lyophilisation. Alternatively, however, it is possible to cause the emulsion/suspension to coagulate using known methods (addition of electrolyte, freezing out) and to isolate the resulting product in the form of a solid substance by filtration, which solid substance can be converted, as appropriate, into the desired particle size by further pulverisation. It is also possible for the product to be obtained by concentrating the emulsion to dryness by evaporation and converting the residue into the desired form using known methods.

Depending on the intended use, it is not, however, absolutely necessary to isolate the microgel amine salt of the invention in the form of a solid substance; it can also be used in the form of an aqueous emulsion/suspension or in the form of an emulsion/suspension in an organic solvent or in a mixture of more than one organic solvent.

The invention relates also to a process for the preparation of a reaction product according to the invention, which comprises reacting a microgel that contains carboxylic acid groups with a nitrogen-containing base at a temperature of from 0° C. to 200° C., preferably from 10° C. to 100° C., the starting materials being used in amounts such that the number of carboxylic acid groups is equal to or greater than the number of basic nitrogen atoms.

The process for the preparation of the microgel amine salts according to the invention is significantly simpler than the preparation of the encapsulated amines according to EP-A-304 503.

As mentioned at the outset, the microgel amine salts according to the invention are suitable especially as hardeners or curing-accelerators for epoxy resins.

The invention accordingly relates also to a composition comprising:

(a) an epoxy resin having on average more than one 1,2-epoxide group per molecule, and (b) a reaction product of a microgel that contains carboxylic acid groups with a nitrogen-containing base (microgel amine salt).

Suitable as component (a) for the preparation of the compositions according to the invention are the epoxy resins customarily employed in epoxy resin technology. Examples of epoxy resins are:

I) Polyglycidyl and poly($\beta$-methylglycidyl) esters, obtainable by reaction of a compound having at least two carboxy groups in the molecule with epichlorohydrin or $\beta$-methyl-epichlorohydrin, respectively. The reaction is advantageously carried out in the presence of bases.

As compounds having at least two carboxy groups in the molecule there may be used aliphatic polycarboxylic acids. Examples of such polycarboxylic acids are oxalic acid, succinic acid, glutaric acid, adipic acid, pimelic acid, suberic acid, azelaic acid and dimerised or trimerised linoleic acid.

It is also possible, however, to use cycloaliphatic polycarboxylic acids, for example tetra-hydrophthalic acid, 4-methyltetrahydrophthalic acid, hexahydrophthalic acid and 4-methyl-hexahydrophthalic acid.

Aromatic polycarboxylic acids may also be used, for example phthalic acid, isophthalic acid and terephthalic acid.

II) Polyglycidyl or poly($\beta$-methylglycidyl) ethers, obtainable by reaction of a compound having at least two free alcoholic hydroxy groups and/or phenolic hydroxy groups with epichlorohydrin or $\beta$-methylepichlorohydrin, respectively, under alkaline conditions or in the presence of an acid catalyst with subsequent alkaline treatment.

Such glycidyl ethers are derived, for example, from acyclic alcohols, e.g. from ethylene glycol, diethylene glycol or higher poly(oxyethylene) glycols, propane-1,2-diol or poly-(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and also from polyepichlorohydrins. Further such glycidyl ethers are derived from cycloaliphatic alcohols, such as 1,4-cyclohexanedimethanol, bis(4-hydroxycyclohexyl)methane or 2,2-bis(4-hydroxycyclohexyl)propane, or from alcohols containing aromatic groups and/or further functional groups, such as N,N-bis(2-hydroxyethyl)aniline or p,p'-bis(2-hydroxyethylamino)diphenylmethane.

The glycidyl ethers may be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane. Further suitable hydroxy compounds for the preparation of glycidyl ethers are novolaks, obtainable by condensation of aldehydes, such as formaldehyde, acetaldehyde, chloral or furfuraldehyde, with phenols or bisphenols unsubstituted or substituted by chlorine atoms or by $C_1$–$C_9$ alkyl groups, for example phenol, 4-chlorophenol, 2-methylphenol or 4-tert-butyl-phenol.

III) Poly(N-glycidyl) compounds, obtainable by dehydrochlorination of the reaction products of epichlorohydrin with amines that contain at least two amine hydrogen atoms. Those amines are, for example, aniline, n-butylamine, bis(4-aminophenyl)methane, m-xylylene-diamine or bis(4-methylaminophenyl) methane.

The poly(N-glycidyl) compounds, however, include also triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, for example ethane-1,2-dithiol or bis(4-mercaptomethylphenyl) ether.

V) Cycloaliphatic epoxy resins, for example bis(2,3-epoxycyclopentyl) ether, 2,3-epoxycyclopentylglycidyl ether, 1,2-bis(2,3-epoxycyclopentyloxy)ethane or 3,4-epoxycyclohexylmethyl-3',4'-epoxycyclohexanecarboxylate.

Alternatively, epoxy resins may be used in which the 1,2-epoxide groups are bonded to different hetero atoms and/or functional groups; those compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin and 2-glycidyloxy-1,3-bis-(5,5-dimethyl-1-glycidylhydantoin-3-yl)propane.

For the preparation of the epoxy resin compositions according to the invention, it is preferred to use a liquid or solid polyglycidyl ether or ester, especially a liquid or solid diglycidyl ether of bisphenol or a solid or liquid diglycidyl ester of a cycloaliphatic or aromatic dicarboxylic acid, or a cycloaliphatic epoxy resin. Mixtures of epoxy resins may also be used.

Suitable solid polyglycidyl ethers and esters are compounds having melting points above room temperature up to approximately 250° C. Preferably the melting points of the solid compounds are in the range from 50 to 150° C. Such solid compounds are known and some of them are commercially available. As solid polyglycidyl ethers and esters there may also be used the advancement products obtained by pre-extension of liquid polyglycidyl ethers and esters.

The epoxy resin compositions according to the invention especially comprise a liquid polyglycidyl ether or ester.

Especially preferred as component (a) are a diglycidyl ether of bisphenol A and a diglycidyl ether of bisphenol F.

The microgel amine salts according to the invention may be used not only as hardeners but also as accelerators for curing using other curing agents.

The present invention accordingly relates also to a composition comprising:

(a) an epoxy resin having on average more than one 1,2-epoxide group per molecule, (b) a reaction product of a microgel that contains carboxylic acid groups with a nitrogen-containing base (microgel amine salt) and (c) a hardener for the epoxy resin (a) that is different from component (b).

Preferred hardeners are polycarboxylic acid anhydrides.

The anhydrides may be linear aliphatic polymeric anhydrides, for example polysebacic acid polyanhydride or polyazelaic acid polyanhydride, or cyclic carboxylic acid anhydrides.

Cyclic carboxylic acid anhydrides are especially preferred.

Examples of Cyclic Carboxylic Acid Anhydrides are
succinic acid anhydride, citraconic acid anhydride, itaconic acid anhydride, alkenyl-substituted succinic acid anhydrides, dodecenylsuccinic acid anhydride, maleic acid anhydride and tricarballylic acid anhydride, adduct of maleic acid anhydride with cyclopentadiene or methylcyclopentadiene, adduct of linoleic acid with maleic acid anhydride, alkylated endoalkylenetetrahydrophthalic acid anhydrides, methyltetrahydrophthalic acid anhydride and tetrahydrophthalic acid anhydride; the isomeric mixtures of the latter two are especially suitable. Also preferred are hexahydrophthalic acid anhydride and methylhexahydrophthalic acid anhydride.

Further examples of cyclic carboxylic acid anhydrides are aromatic anhydrides, for example pyromellitic acid dianhydride, trimellitic acid anhydride and phthalic acid anhydride.

Chlorinated or brominated anhydrides, for example tetrachlorophthalic acid anhydride, tetrabromophthalic acid anhydride, dichloromaleic acid anhydride and chlorendic anhydride, may also be used.

Also suitable as hardeners are the carboxylic acids, derived from the above-mentioned carboxylic acid anhydrides, that have at least two carboxy groups per molecule or at least one carboxy group and one anhydride group per molecule. A further suitable hardener is dicyandiamide.

The relative proportions of components (a) and (b) can vary within wide limits in the compositions according to the invention. The optimum ratio is, inter alia, dependent on the type of amine and on the amine content of the microgel amine salt and can be determined readily by the person skilled in the art.

When the microgel amine salt is used as a hardener, the weight ratio of components (a):(b) is advantageously from 1:5 to 500:1, preferably from 1:2 to 200:1 and especially from 1:1 to 100:1.

When the microgel amine salt is used as an accelerator, substantially smaller amounts are effective. The weight ratio of components (a):(b) is in that case advantageously from 1:2 to 2000:1, preferably from 1:1 to 1000:1 and especially from 2:1 to 1000:1.

The compositions according to the invention may, where appropriate, comprise further accelerators, such as imidazoles or benzyldimethylamine.

Furthermore, the curable mixtures may comprise tougheners, for example core/shell polymers or the elastomers or elastomer-containing graft polymers that are known to the person skilled in the art as "rubber tougheners".

Suitable tougheners are described, for example, in EP-A-449 776.

Moreover, the curable mixtures may comprise fillers, such as metal powder, wood dust, glass powder, glass beads, semimetal oxides and metal oxides, for example $SiO_2$ (aerosils, quartz, quartz powder, fused silica powder), corundum and titanium oxide, semimetal nitrides and metal nitrides, such as silicon nitride, boron nitride and aluminum nitride, semimetal carbides and metal carbides (SiC), metal carbonates (dolomite, chalk, $CaCO_3$), metal sulfates (barite, gypsum), mineral fillers and natural or synthetic minerals mainly from the silicates series, such as zeolites (especially molecular sieves) talcum, mica, kaolin, wollastonite, bentonite and others.

In addition to the above-mentioned additives, the curable mixtures may comprise further customary adjuvants, for example antioxidants, light stabilizers, plasticizers, colorants, pigments, thixotropic agents, toughness improvers, antifoams, antistatics, glidants and demoulding auxiliaries.

The compositions according to the invention may be prepared in accordance with known methods using known mixing apparatus, for example stirrers, kneaders, rollers or dry mixers. In the case of solid epoxy resins, dispersing may be carried out also in the melt. The temperature during the dispersing is to be so selected that premature curing does not occur during the mixing process. The optimum curing conditions are dependent on the microgel, on the type and amount of the nitrogen-containing base, on the epoxy resin and on the form of dispersing, and can be determined by the person skilled in the art in each case using known methods.

When component (b) is in the form of a solid, the microgel amine salt is dispersed in the epoxy resin (a) or in a solution of the epoxy resin (a) by known methods, for example by simple stirring or by stirring with the aid of glass beads. The operation is advantageously carried out at a temperature below the temperature at which the microgel amine salt and the epoxy resin start to react. Preferably the operation is carried out at temperatures below 60° C.

When component (b) is in the form of a suspension in water or in a solvent, that suspension is first mixed with the epoxy resin. The water or solvent is then removed by known methods, for example by distillation or freeze-drying. The operation is advantageously carried out at a temperature below the temperature at which the microgel amine salt and the epoxy resin start to react. Preferably the operation is carried out at temperatures below 60° C.

When component (b) is used as an accelerator, the microgel amine salt may also be dispersed in the hardener (c).

The curing of the epoxy resin compositions according to the invention into moulded bodies, coatings or the like is carried out in a manner customarily employed in epoxy resin technology, as described, for example, in "Handbook of Epoxy Resins", 1967, by H. Lee and K. Neville.

Because of the high latency of the microgel amine salts according to the invention, the curable compositions have high storage stability and a long usable life and also high resistance to strong mechanical influences (shearing load, compressive load).

The compositions according to the invention are excellently suitable as casting resins, laminating resins, adhesives, compression moulding compounds, coating compounds and encasing systems for electrical and electronic components, especially as casting resins, laminating resins and adhesives.

The present invention relates also to the cross-linked products prepared from the compositions according to the invention, such as moulded materials, coatings or bonded materials.

EXAMPLES

I. Preparation of Microgels that Contain Carboxylic Acid Groups

Example I.1

Microgel of Methacrylic Acid, Ethyl Acrylate, Methyl Methacrylate, Ethylene Glycol Dimethacrylate and Trimethylolpropane Trimethacrylate First, a monomer mixture of 21 g of methacrylic acid, 15 g of ethyl acrylate, 12 g of methyl methacrylate, 6 g of ethylene glycol dimethacrylate and 6 g of trimethylolpropane trimethacrylate is prepared.

In a sulfonating flask equipped with a glass anchor stirrer, a thermometer, a gas connection and a metering connection, 1.8 g of sodium dodecyl sulfate and 320 g of deionised water are stirred under nitrogen (approx. 200 rev/min) and heated at 65° C. (internal temperature). 6 ml of the above monomer mixture and a solution of 0.026 g of ammonium persulfate in 20 ml of deionised water are then added. The resulting mixture is heated to 70° C. and, after 15 minutes' stirring at 70° C., the remainder of the monomer mixture is added in the course of 1 h 45 min. After 2 hours' stirring at 70° C., a solution of 0.078 g of ammonium persulfate in 2 g of deionised water is added, and the reaction mixture is stirred at 70° C. for a further 4 hours. After cooling to room temperature, the contents of the reaction vessel are filtered through a paper filter. The resulting emulsion has a solids content of 13.8% and an acid value of 0.60 mol/kg, and can be reacted directly with an amine or imidazole to form a microgel amine salt according to the invention.

Example I.2
Microgel of Methacrylic Acid, Ethyl Acrylate, Methyl Methacrylate, Ethylene Glycol Dimethacrylate and Trimethylolpropane Trimethacrylate First, a monomer mixture of 57.6 g of methacrylic acid, 48 g of ethyl acrylate, 86.4 g of methyl methacrylate, 24 g of ethylene glycol dimethacrylate and 24 g of trimethylolpropane trimethacrylate is prepared.

In a sulfonating flask equipped with a glass anchor stirrer, a thermometer, a gas connection and a metering connection, 7.2 g of sodium dodecyl sulfate and 1280 g of deionised water are stirred under nitrogen (approx. 200 rev/min) and heated at 65° C. (internal temperature). 24 ml of the above monomer mixture and a solution of 0.104 g of ammonium persulfate in 80 ml of deionised water are then added. The resulting mixture is heated to 70° C. and, after 15 minutes' stirring at 70° C., the remainder of the monomer mixture is added in the course of approximately 2 hours. After 2 hours' stirring at 70° C., a solution of 0.312 g of ammonium persulfate in 8 g of deionised water is added, and the reaction mixture is stirred at 70° C. for a further 6 hours. After cooling to room temperature, the contents of the reaction vessel are filtered through a paper filter. The resulting emulsion has a solids content of 14.2% and an acid value of 0.45 mol/kg, and can be reacted directly with an amine or imidazole to form a microgel amine salt according to the invention.

Example I.3
Microgel of Methacrylic Acid, Methyl Methacrylate, Ethylene Glycol Dimethacrylate and Trimethylolpropane Trimethacrylate First, a monomer mixture of 14.4 g of methacrylic acid, 33.6 g of methyl methacrylate, 6 g of ethylene glycol dimethacrylate and 6 g of trimethylolpropane trimethacrylate is prepared.

In a sulfonating flask equipped with a glass anchor stirrer, a thermometer, a gas connection and a metering connection, 1.8 g of sodium dodecyl sulfate and 320 g of deionised water are stirred under nitrogen (approx. 200 rev/min) and heated at 65° C. (internal temperature). 6 ml of the above monomer mixture and a solution of 0.026 g of ammonium persulfate in 20 ml of deionised water are then added. The resulting mixture is heated to 70° C. and, after 15 minutes' stirring at 70° C., the remainder of the monomer mixture is added in the course of approx. 1 hour. After 2 hours' stirring at 70° C., a solution of 0.026 g of ammonium persulfate in 2 g of deionised water is added, and the reaction mixture is stirred at 70° C. for a further 6 hours. After cooling to room temperature, the contents of the reaction vessel are filtered through a paper filter. The resulting emulsion has a solids content of 14.0% and an acid value of 0.41 mol/kg, and can be reacted directly with an amine or imidazole to form a microgel amine salt according to the invention.

Example I.4
Microgel of Methacrylic Acid, Methyl Methacrylate, Ethylene Glycol Dimethacrylate, Trimethylolpropane Trimethacrylate and Silicone Diacrylate First, there is prepared a monomer mixture of 15.66 g of methacrylic acid, 38.82 g of methyl methacrylate, 6.47 g of ethylene glycol dimethacrylate, 6.47 g of trimethylolpropane trimethacrylate and 0.68 g of silicone diacrylate (Ebecryl® 350 (Radcure Specialties)) and an initiator solution of 0.1 g of sodium persulfate in 10 g of deionised water.

In a sulfonating flask equipped with a glass anchor stirrer, a thermometer, a gas connection and a metering connection, 2.07 g of sodium dodecyl sulfate and 388 g of deionised water are stirred under nitrogen (approx. 200 rev/min) and heated at 60° C. (internal temperature). 6.8 ml of the above monomer mixture and 3 ml of the initiator solution are then added. The resulting mixture is heated to 65° C. and, after 15 minutes' stirring at 65° C., the remainder of the monomer mixture is added in the course of approximately 1 hour. After 2 hours' stirring at 65° C., 1 ml of the initiator solution is added and, after a further 3 hours, a further 2 ml of the initiator solution are added. The reaction mixture is stirred for a further 2.75 hours at 65° C. After cooling to room temperature, the contents of the reaction vessel are filtered through a paper filter. The resulting emulsion has a solids content of 14.3% and an acid value of 0.402 mol/kg, and can be reacted directly with an amine or imidazole to form a microgel amine salt according to the invention.

II. Preparation of Microgel Amine Salts

Example II.1

A solution of 5.95 g of 2-ethyl-4-methylimidazole in 110 ml of isopropanol is added, with stirring, to 100 g of the aqueous emulsion prepared in accordance with Example I.1. The resulting emulsion of a microgel imidazole salt (particle size: 180 nm) is spray-dried (inlet temperature: 132° C., outlet temperature: 72–76° C.). The dried microgel imidazole powder has an amine value of 2.55 mol/kg and an acid value of 2.97 mol/kg. Thermogravimetric analysis (TGA) shows onset of weight loss at 182° C. (onset temperature).

Example II.2

A solution of 4.63 g of 2-ethyl-4-methylimidazole in 40 g of isopropanol and 40 g of deionised water is added, with stirring, to 100 g of the aqueous emulsion prepared in accordance with Example I.2. The resulting emulsion of a microgel imidazole salt (particle size: approx. 65 nm) is spray-dried (inlet temperature: 132° C., outlet temperature: 62–73° C.). The dried microgel imidazole powder has an amine value of 2.05 mol/kg and an acid value of 2.24 mol/kg. TGA shows onset of weight loss at 180° C. (onset temperature).

Example II.3

A solution of 7.78 g of 2-phenylimidazole in 110 g of isopropanol is added, with stirring, to 100 g of the aqueous emulsion prepared in accordance with Example I.1. The mixture is stirred at room temperature until the precipitate has dissolved. The resulting emulsion of a microgel imidazole salt is spray-dried (inlet temperature: 132° C., outlet temperature: 62–72° C.). The dried microgel imidazole powder has an amine value of 2.30 mol/kg and an acid value of 2.62 mol/kg. TGA shows onset of weight loss at 232° C. (onset temperature).

Example II.4

A solution of 10.1 g of 1-benzyl-2-methylimidazole in 110 g of isopropanol is added, with stirring, to 100 g of the aqueous emulsion prepared in accordance with Example I.1. The mixture is stirred at room temperature until the precipitate has dissolved. The resulting emulsion of a microgel imidazole salt is spray-dried (inlet temperature: 132° C., outlet temperature: 59–62° C.). The dried microgel imidazole powder has an amine value of 2.13 mol/kg and an acid value of 2.56 mol/kg.

Example II.5

A solution of 8.36 g of 2-ethyl-4-methylimidazole in 30 g of isopropanol and 30 g of deionised water is added, with stirring, to 200 g of the aqueous emulsion prepared in accordance with Example I.3. The resulting emulsion of a microgel imidazole salt (particle size: approx. 130 nm) is spray-dried (inlet temperature: 132° C., outlet temperature: 69–72° C.). The dried microgel imidazole powder has an amine value of 2.12 mol/kg and an acid value of 2.47 mol/kg. TGA shows onset of weight loss at 182° C. (onset temperature).

Example II.6

A solution of 8.42 g of 2-ethyl-4-methylimidazole in 20 g of isopropanol is added, with stirring, to 100 g of the aqueous emulsion prepared in accordance with Example I.4. The resulting emulsion of a microgel imidazole salt is spray-dried (inlet temperature: 132° C., outlet temperature: 80° C.). The microgel imidazole powder is then dried in vacuo (200 Torr, 26 660 Pa) at 45° C. for 8 hours and has an amine value of 1.96 mol/kg and an acid value of 2.04 mol/kg.

III. Application Examples

Example III.1

10.46 g of the microgel imidazole powder prepared in accordance with Example II.1. are added to 120 g of a liquid epoxy resin mixture of diglycidyl ether of bisphenol A and diglycidyl ether of bisphenol F having an epoxy value of 5.3 mol/kg, and are dispersed using a Dispermat dispersing apparatus with glass beads at 2000 rev/min (<40° C.) for 30 minutes.

The resulting mixture has a viscosity of 1560 mPa•s at 40° C. The viscosity doubles after 12.5 days' storage at 40° C. and after 90 days' storage at room temperature.

The gelling times measured in dependence on the temperature are given in Table 1.

Example III.2

Analogously to Example III.1., a mixture of 10 g of the microgel imidazole powder prepared in accordance with Example II.2. and 90 g of a liquid epoxy resin mixture of diglycidyl ether of bisphenol A and diglycidyl ether of bisphenol F having an epoxy value of 5.3 mol/kg is prepared. The mixture has a viscosity of 1520 mPa•s at 40° C. The viscosity doubles after 8 days' storage at 40° C.

The gelling times measured in dependence on the temperature are given in Table 1.

Example III.3

Analogously to Example III.1., a mixture of 10.63 g of the microgel imidazole powder prepared in accordance with Example II.3. and 110 g of a liquid epoxy resin mixture of diglycidyl ether of bisphenol A and diglycidyl ether of bisphenol F having an epoxy value of 5.3 mol/kg is prepared. The mixture has a viscosity of 1190 mPa•s at 40° C. The viscosity doubles after 15 days' storage at 40° C.

The gelling times measured in dependence on the temperature are given in Table 1.

Example III.4

Analogously to Example III.1., a mixture of 9.4 g of the microgel imidazole powder prepared in accordance with Example II.4. and 90 g of a liquid epoxy resin mixture of diglycidyl of bis of bisphenol A and diglycidyl ether prepared. The mixture has a viscosity of 1280 mPa•s at 40° C. The viscosity doubles after 5 days' storage at 40° C.

The gelling times measured in dependence on the temperature are given in Table 1.

Example III.5

20 g of the microgel imidazole powder prepared in accordance with Example II.3. are added to 80 g of a liquid epoxy resin mixture (epoxy value: 5.1 mol/kg), prepared by mixing 91 g of diglycidyl ether of bisphenol A and 9 g of polypropylene glycol (400) diglycidyl ether, and dispersed using a Dispermat dispersing apparatus with glass beads at 2000 rev/min (<40° C.) for 30 minutes. 10 g of the resulting mixture are diluted with 70 g of a liquid epoxy resin mixture (epoxy value: 5.1 mol/kg), prepared by mixing 91 g of diglycidyl ether of bisphenol A and 9 g of polypropylene glycol (400) diglycidyl ether, and the mixture is added to 66 g of methyltetrahydrophthalic acid anhydride. The unfilled resin/hardener/accelerator mixture has a viscosity of 150 mPa•s at 40° C. The viscosity doubles after 19 hours' storage at 40° C.

60 g of W12 EST quartz powder are added to 40 g of the unfilled resin/hardener/accelerator mixture and mixed using a Dispermat dispersing apparatus with glass beads at 1000 rev/min (<25° C.). The resulting resin/hardener/accelerator mixture filled with quartz powder has a viscosity of 8800 mPa•s at 40° C. The viscosity doubles after 20 hours' storage at 40° C.

The gelling times measured in dependence on the temperature are given in Table 1.

Example III.6

7 g of the microgel imidazole powder prepared in accordance with Example II.5. are added to 63 g of a liquid epoxy resin mixture (epoxy value: 5.1 mol/kg), prepared by mixing 91 g of diglycidyl ether of bisphenol A and 9 g of polypropylene glycol (400) diglycidyl ether, and dispersed using a Dispermat dispersing apparatus with glass beads at 2000 rev/min (<40° C.) for 30 minutes. 24 g of the resulting mixture are diluted with 56 g of a liquid epoxy resin mixture (epoxy value: 5.1 mol/kg), prepared by mixing 91 g of diglycidyl ether of bisphenol A and 9 g of polypropylene glycol (400) diglycidyl ether, and the mixture is added to 66 g of methyltetrahydrophthalic acid anhydride. The unfilled resin/hardener/accelerator mixture has a viscosity of 152 mPa • s at 40° C. The viscosity doubles after 48 hours' storage at 40° C.

60 g of W12 EST quartz powder are added to 40 g of the unfilled resin/hardener/accelerator mixture and mixed using a Dispermat dispersing apparatus with glass beads at 1000 rev/min (<25° C.). The resulting resin/hardener/accelerator mixture filled with quartz powder has a viscosity of 5000 mPa·s at 40° C. The viscosity doubles after 46 hours' storage at 40° C.

The gelling times measured in dependence on the temperature are given in Table 1.

Example III.7

10.0 g of the microgel imidazole powder prepared in accordance with Example II.6. are added to 100 g of a liquid epoxy resin mixture (epoxy value: 5.1 mol/kg), prepared by mixing 91 g of diglycidyl ether of bisphenol A and 9 g of polypropylene glycol (400) diglycidyl ether, and dispersed using a Dispermat dispersing apparatus with glass beads at 2000 rev/min (<40° C.) for 30 minutes. 13.2 g of the resulting composition are diluted with 26.8 g of a liquid epoxy resin mixture (epoxy value: 5.1 mol/kg), prepared by mixing 91 g of diglycidyl ether of bisphenol A and 9 g of polypropylene glycol (400) diglycidyl ether, and the mixture is added to 33 g of methyltetrahydrophthalic acid anhydride. The unfilled resin/hardener/accelerator mixture has a viscosity of 145 mPa·s at 4000. The viscosity doubles after 85 hours' storage at 40° C.

The gelling times measured in dependence on the temperature are given in Table 1.

TABLE 1

| Example | Gelling times [s] at different temperatures | | | | | |
|---|---|---|---|---|---|---|
| | 100° C. | 120° C. | 130° C. | 140° C. | 150° C. | 160° C. |
| III.1. | >6000 | 893 | 305 | 150 | 102 | 71 |
| III.2. | 4800 | 295 | 170 | 109 | 77 | 58 |
| III.3. | 2400 | 400 | 258 | 155 | 132 | 83 |
| III.4. | 922 | 245 | 161 | 119 | 87 | 68 |
| III.5. | 2520 | 740 | 445 | 270 | 164 | 108 |
| III.6. | 4700 | 793 | 440 | 253 | 154 | 96 |
| III.7. | 4800 | 943 | 526 | 300 | 182 | 113 |

What is claimed is:

1. A reaction product of a microgel that contains carboxylic acid groups with a nitrogen-containing base in the form of a solid powder.

2. A reaction product according to claim 1, wherein the microgel is a copolymer of at least one unsaturated carboxylic acid and at least one multifunctional cross-linker.

3. A reaction product according to claim 1, wherein the microgel is a copolymer of at least one unsaturated carboxylic acid, at least one vinyl monomer that contains no carboxylic acid groups and at least one multifunctional cross-linker.

4. A reaction product according to claim 2, wherein the unsaturated carboxylic acid is selected from acrylic acid, methacrylic acid, 2-carboxyethyl acrylate, 2-carboxyethyl methacrylate, phthalic acid mono(2-acryloylethyl) ester, phthalic acid mono(2-methacryloylethyl) ester, maleic acid, maleic acid monomethyl ester, maleic acid monoethyl ester, fumaric acid, fumaric acid monomethyl ester, fumaric acid monoethyl ester, itaconic acid, cinnamic acid, crotonic acid, 4-vinylcyclohexanecarboxylic acid, 4-vinylphenylacetic acid and p-vinylbenzoic acid.

5. A reaction product according to claim 2, wherein the unsaturated carboxylic acid is acrylic acid or methacrylic acid.

6. A reaction product according to claim 2, wherein the multifunctional cross-linker is a polyfunctional acrylic acid ester or methacrylic acid ester of an aliphatic, cycloaliphatic or aromatic polyol, an addition product of acrylic acid or methacrylic acid and a polyglycidyl compound, an addition product of acrylic acid or methacrylic acid and glycidyl acrylate or methacrylate, an acrylic acid alkenyl ester or methacrylic acid alkenyl ester, a dialkenylcyclohexane or a dialkenylbenzene.

7. A reaction product according to claim 2, wherein the multifunctional cross-linker is selected from ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropane trimethacrylate, diglycidyl ether diacrylate of bisphenol A, diglycidyl ether dimethacrylate of bisphenol A, acrylic acid allyl ester, methacrylic acid allyl ester, divinylcyclohexane and divinylbenzene.

8. A reaction product according to claim 3, wherein the vinyl monomer that contains no carboxylic acid groups is an alkyl ester, hydroxyalkyl ester, glycidyl ester of an unsaturated carboxylic acid or a styrene.

9. A reaction product according to claim 3, wherein the vinyl monomer that contains no carboxylic acid groups is methyl acrylate, methyl methacrylate, ethyl acrylate, ethyl methacrylate, 2-hydroxyethyl acrylate, 2-hydroxyethyl methacrylate, butyl acrylate, butyl methacrylate, 2-ethylhexyl acrylate, 2-ethylhexyl methacrylate or styrene.

10. A reaction product according to claim 1, where the microgel is a copolymer of from 2 to 70% by weight of at least one unsaturated carboxylic acid, from 0 to 96% by weight of at least one vinyl monomer that contains no carboxylic acid groups and from 2 to 70% by weight of at least one multifunctional cross-linker.

11. A reaction product according to claim 1, wherein the nitrogen-containing base is an amine, a polyamine or an imidazole.

12. A reaction product according to claim 1, wherein the nitrogen-containing base is an amine or imidazole of formula I, II or III $NR_1R_2R_3$     (I), $R_4R_5N-A-R_6R_7$     (II), (III)

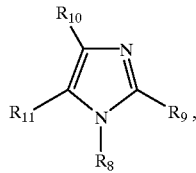

wherein $R_1$ to $R_7$ are each independently of the others, $C_1$–$C_{12}$alkyl, phenyl, benzyl, phenylethyl, cyclopentyl or cyclohexyl, or $R_2$ and $R_3$ or $R_4$ and $R_5$ or $R_6$ and $R_7$ together form tetramethylene, pentamethylene, —$(CH_2)_2$—O—$(CH_2)_2$— or —$(CH_2)_2$—NH—$(CH_2)_2$—, A is a bivalent radical of a $C_1$–$C_{30}$alkane, $R_8$ to $R_{11}$ are each independently of the others hydrogen, $C_1$–$C_{18}$alkyl, phenyl or benzyl, or $R_8$ and $R_9$ or $R_8$ and $R_{11}$ or $R_{10}$ and $R_{11}$ together form tetramethylene, pentamethylene, —$(CH_2)_2$—O—$(CH_2)_2$— or —$(CH_2)_2$—NH—$(CH_2)_2$—.

13. A reaction product according to claim 1, wherein the nitrogen-containing base is 2-phenylimidazole, 2-isopropylimidazole, 2-dodecylimidazole, 2-heptadecylimidazole or 2-ethyl-4-methylimidazole.

14. A process for the preparation of a reaction product according to claim 1, wherein a microgel that contains carboxylic acid groups is reacted with a nitrogen-containing base at a temperature of from 0° C. to 200° C., the starting materials being used in amounts such that the number of carboxylic acid groups is equal to or greater than the number of basic nitrogen atoms.

15. A reaction product according to claim 3, wherein the unsaturated carboxylic acid is selected from acrylic acid, methacrylic acid, 2-carboxyethyl acrylate, 2-carboxyethyl methacrylate, phthalic acid mono(2-acryloylethyl) ester, phthalic acid mono(2-methacryloylethyl) ester, maleic acid, maleic acid monomethyl ester, maleic acid monoethyl ester, fumaric acid, fumaric acid monomethyl ester, fumaric acid monoethyl ester, itaconic acid, cinnamic acid, crotonic acid, 4-vinylcyclohexanecarboxylic acid, 4-vinylphenylacetic acid and p-vinylbenzoic acid.

16. A reaction product according to claim 3, wherein the unsaturated carboxylic acid is acrylic acid or methacrylic acid.

17. A reaction product according to claim 3, wherein the multifunctional cross-linker is a polyfunctional acrylic acid ester or methacrylic acid ester of an aliphatic, cycloaliphatic or aromatic polyol, an addition product of acrylic acid or methacrylic acid and a polyglycidyl compound, an addition product of acrylic acid or methacrylic acid and glycidyl acrylate or methacrylate, an acrylic acid alkenyl ester or methacrylic acid alkenyl ester, a dialkenylcyclohexane or a dialkenylbenzene.

18. A reaction product according to claim 3, wherein the multifunctional cross-linker is selected from ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropane trimethacrylate, diglycidyl ether diacrylate of bisphenol A, diglcidyl ether diacrylate of bisphenol A, diglycidyl ether dimethacrylate of bisphenol A, acrylic acid allyl ester, methacrylic acid allyl ester, divinylcyclohexane and divinylbenzene.

* * * * *